United States Patent [19]

Nanataki et al.

[11] Patent Number: 5,728,244
[45] Date of Patent: Mar. 17, 1998

[54] PROCESS FOR PRODUCTION OF CERAMIC MEMBER HAVING FINE THROUGHHOLES

[75] Inventors: Tsutomu Nanataki, Toyoake; Shigeki Nakao, Nagoya, both of Japan

[73] Assignee: NGK Insulators, Ltd., Japan

[21] Appl. No.: 649,485

[22] Filed: May 17, 1996

[30] Foreign Application Priority Data

| May 26, 1995 | [JP] | Japan | 7-128134 |
| Dec. 20, 1995 | [JP] | Japan | 7-331708 |
| Dec. 20, 1995 | [JP] | Japan | 7-331709 |

[51] Int. Cl.$^6$ ............................................. B32B 31/26
[52] U.S. Cl. ........................... 156/89; 156/252; 156/253
[58] Field of Search .......................... 156/89, 252, 253; 264/56, 61; 347/40, 41, 42, 43, 44, 54, 71, 72, 74; 428/49, 131, 210, 325

[56] References Cited

U.S. PATENT DOCUMENTS

| 4,695,854 | 9/1987 | Cruz-Uribe | 347/40 |
| 4,710,250 | 12/1987 | Kojima et al. | 156/89 |
| 5,376,856 | 12/1994 | Takeuchi et al. | 347/71 X |
| 5,517,076 | 5/1996 | Takeuchi et al. | |
| 5,545,461 | 8/1996 | Takeuchi et al. | 156/89 X |

FOREIGN PATENT DOCUMENTS

| 0526048 | 2/1993 | European Pat. Off. |
| 0572231 | 12/1993 | European Pat. Off. |
| 0636593 | 2/1995 | European Pat. Off. |
| 0649008 | 4/1995 | European Pat. Off. |

*Primary Examiner*—Curtis Mayes
*Attorney, Agent, or Firm*—Parkhurst & Wendel

[57] ABSTRACT

A process for producing a ceramic member having fine throughholes, includes a step of preparing a first green sheet for a thin ceramic plate, a step of forming, in the first green sheet, a plurality of fine throughholes so that the hole-to-hole distance after sintering becomes 70 μm or less, a step of preparing a second green sheet for a ceramic substrate, a step of forming at least one window in the second green sheet, a step of laminating the first green sheet having a plurality of fine throughholes, on the second green sheet having at least one window so that the plurality of fine throughholes correspond to the at least one window, to form a unitary laminate, and a step of sintering the laminate to produce a unitarily sintered material as a ceramic member having fine throughholes. Alternatively, the throughholes can be formed after the first and second sheets are laminated.

28 Claims, 6 Drawing Sheets

PROCESS FOR PRODUCTION OF CERAMIC MEMBER HAVING FINE THROUGHHOLES

BACKGROUND OF THE INVENTION AND RELATED ART

The present invention relates to a process for producing a ceramic member having a plurality of fine throughholes.

Members having fine throughholes, used in products such as encoders, high-precision fine electric field shutters, ion current-controlling heads, scales and the like have heretofore been made of metals, synthetic resins, etc. for their excellent processability.

In the above products, members having fine throughholes are used to detect the position of the object to be treated or to record by or without passing, through the fine throughholes, a gas, a liquid, fine particles, a light or the like.

In recent years, higher density, higher precision and higher reliability have come to be required for these members having throughholes.

The above requirements, however, are not satisfied with the conventional materials, i.e. metals, synthetic resins, etc. Therefore, development of a member made of a new material has been expected.

In view of the above situation, the object of the present invention is to provide a member having fine throughholes, which is made having a material of heat resistance, abrasion resistance and low thermal expansion, and which satisfies the requirements of high density, high precision and increased reliability to be possessed by such apparatuses as encoders, high-precision fine electric field shutters, ion current-controlling heads, scales and the like.

SUMMARY OF THE INVENTION

The first aspect of the present invention lies in a process for producing a ceramic member having fine throughholes, which comprises:

a step of preparing a first green sheet for a thin ceramic plate, a step of forming, in the first green sheet, a plurality of fine throughholes so that the hole-to-hole distance after sintering becomes 70 μm or less, a step of preparing a second green sheet for a ceramic substrate, a step of forming at least one window in the second green sheet, a step of laminating the first green sheet having a plurality of fine throughholes, on the second green sheet having at least one window so that the plurality of fine throughholes correspond to the at least one window, to form a unitary laminate, and a step of sintering the laminate to produce a unitarily sintered material as a ceramic member having fine throughholes.

The second aspect of the present invention lies in a process for producing a ceramic member having fine throughholes, which comprises:

a step of preparing a first green sheet for a thin ceramic plate, a step of preparing a second green sheet for a ceramic substrate, a step of forming at least one window in the second green sheet, a step of laminating the first green sheet on the second green sheet having at least one window so that the first green sheet covers the at least one window, to form a unitary laminate, a step of forming, in the laminate, a plurality of fine throughholes at the portion(s) of the first green sheet corresponding to the at least one window of the second green sheet so that the hole-to-hole distance after sintering becomes 70 μm or less, and a step of sintering the laminate to produce a unitarily sintered material as a ceramic member having fine throughholes.

The third aspect of the present invention lies in a process for producing a ceramic member having fine throughholes, which comprises:

a step of preparing a first green sheet for a thin ceramic plate, a step of forming a plurality of fine throughholes in the first green sheet, a step of preparing a second green sheet for a ceramic substrate, a step of forming at least one window in the second green sheet, a step of laminating the first green sheet having a plurality of fine throughholes, on the second green sheet having at least one window so that the plurality of fine throughholes correspond to the at least one window, to form a unitary laminate, and a step of sintering the laminate to produce a unitarily sintered material as a ceramic member having fine throughholes, in which process the window and the fine throughholes corresponding to the window are formed so that they satisfy the following relation:

$$W(mm) \geq 0.01/d(mm)$$

wherein w is the short side length (width) of the window after sintering and d is the hole-to-hole distance after sintering.

The fourth aspect of the present invention lies in a process for producing a ceramic member having fine throughholes, which comprises:

a step of preparing a first green sheet for a thin ceramic plate, a step of preparing a second green sheet for a ceramic substrate, a step of forming at least one window in the second green sheet, a step of laminating the first green sheet on the second green sheet having at least one window so that the first green sheet covers the at least one window, to form a unitary laminate, a step of forming, in the laminate, a plurality of fine throughholes at the portion(s) of the first green sheet corresponding to the at least one window of the second green sheet, and a step of sintering the laminate to produce a unitarily sintered material as a ceramic member having fine throughholes, in which process the window and the fine throughholes corresponding to the window are formed so that they satisfy the following relation:

$$W(mm) \geq 0.01/d(mm)$$

wherein w is the short side length (width) of the window after sintering and d is the hole-to-hole distance after sintering.

The preferred embodiments of the present invention include those ceramic members having fine throughholes wherein the thin ceramic plate is composed mainly of partially stabilized zirconia, or the thin ceramic plate composed mainly of partially stabilized zirconia comprises crystal grains having diameters of 2 μm or less, or the partially stabilized zirconia in the thin ceramic plate is zirconia stabilized partially with 2-6 mole % of yttrium oxide, or the fine throughholes of the thin ceramic plate have diameters of generally 150 μm or less, preferably 70 μm or less, or the thin ceramic plate has a thickness of generally 100 μm or less, preferably 50 μm or less, or the ceramic substrate has a thickness of 80 μm or more, preferably 100 μm or more.

Herein, the diameter of each fine throughhole refers to a diameter when the throughhole has a circular shape; a long side when the throughhole has a rectangular shape; a major axis when the throughhole has an elliptic shape; and the longest diagonal when the throughhole has a polygonal shape. The shape of each fine throughhole may be one of the above-mentioned shapes or a combination thereof. Incidentally, the diameter of each fine throughhole is taken as the average of the diameters of each fine throughhole at the both sides of thin ceramic plate.

Figure 6:
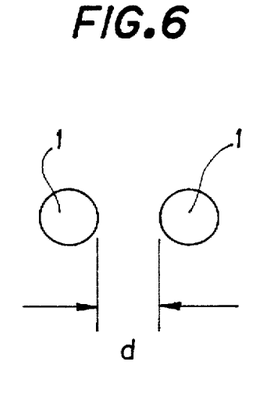
FIG. 6 is a drawing showing the distance "d" between two adjacent fine throughholes.

The distance "d" between two adjacent fine throughholes refers to the smallest wall thickness between two adjacent fine throughholes as shown in FIG. 6.

DETAILED DESCRIPTION OF THE INVENTION

The present invention is hereinafter described specifically.

In the present invention, a ceramic member having fine throughholes is produced by laminating a first thin green sheet having fine throughholes formed therein, on a second green sheet for a ceramic substrate and sintering the resulting laminate to obtain a unitarily sintered material.

In order to form the fine throughholes in the first green sheet at a high productivity with no variation in hole diameter or no moldability problem, the thickness of the first green sheet must be appropriately small. By superimposing the second green sheet on the first green sheet, the resulting ceramic member is allowed to have appropriate stiffness and practical applicability.

Generally, in sintering a unitary laminate having a plurality of fine throughholes as in the present process, cracks appear between the fine throughholes or in the vicinities thereof owing to the stress generating in the laminate during the sintering. To solve this problem, it is desirable that, in the present process, the window of the second green sheet and the throughholes of the first green sheet corresponding to the window are formed so that they have the following relation:

$$W(mm) \geq 0.01/d(mm)$$

preferably $$W(mm) \geq 0.025/d(mm)$$

more preferably $$W(mm) \geq 0.05/d(mm)$$

wherein w is the short side length (width) of the window after sintering in the layer adjoining the thin ceramic plate and d is the shortest hole-to-hole distance after sintering.

When w (the short side length of window) is 10 mm or more, there arise reductions in, for example, (1) handleability of the green laminate, (2) strength of the thin ceramic plate of the sintered laminate, and (3) flatness of the thin ceramic plate of the sintered laminate.

It is also preferable that, in the present process, the ceramic member having fine throughholes is produced so as to have a hole-to-hole distance (after sintering) of 70 μm or less. Thereby, the ceramic member has a high density. Being made of a ceramic, the ceramic member produced by the present process, also has good reliability.

The second green sheet (which becomes a ceramic substrate after sintering) allows the resulting ceramic member to have not only sufficient stiffness but also high dimensional stability. The thin first green sheet, which has a plurality of fine throughholes, tends to generate strain, when sintered alone, owing to the shrinkage, and this problem is eliminated by the use of the second green sheet.

In the ceramic member produced by the present process, the thin ceramic plate is preferably made of partially stabilized zirconia. Partially stabilized zirconia has a small thermal expansion coefficient as compared with metals, and can endow throughholes with high position precision even at high temperatures. Further, partially stabilized zirconia has a large strength among various ceramic materials and accordingly has good handleability, durability and reliability; moreover, it has excellent corrosion resistance, abrasion resistance and heat resistance and accordingly can be applied to various media over a wide temperature range.

The thin ceramic plate composed mainly of partially stabilized zirconia comprises crystal grains having diameters of 2 μm or less, preferably 1 μm or less. This diameter range is necessary so that the thin ceramic plate composed mainly of partially stabilized zirconia can have sufficient levels of strength, abrasion resistance and corrosion resistance.

Yttrium oxide is used in amounts of 2-6 mole %, preferably 2.5-4.0 mole % as an agent for partial stabilization of zirconia. This amount of yttrium oxide is necessary in order for the thin ceramic plate to have sufficient levels of strength and abrasion resistance.

The fine throughholes of the thin ceramic plate have diameters of generally 150 μm or less, preferably 70 μm or less. Such diameters are necessary so that the ceramic member of the present invention can respond to requirements of high density and high precision. In order to form fine throughholes having diameters of 150 μm or less, it is preferable that the thin ceramic plate is made of partially stabilized zirconia. Each of the fine holes may have a different size from those of the other fine throughholes. When fine throughholes all having the same size are formed, variance of sizes of the fine throughholes after being fired is desirably ≦5 μm or less, more desirably ≦3 μm or less, so as to avoid variance in properties.

The thin ceramic plate has a thickness of 100 μm or less, preferably 70 μm or less, more preferably 50 μm or less. This small thickness makes formation of fine throughholes easy. That is, in punching by the use of a die or an NC punching machine, broken pin defects, variation in hole diameter at the top side and bottom side of the plate, and formation of fins on the plate surface or the inner surface of the fine throughholes can be decreased or avoided; and, in laser processing, variation in hole diameter, formation of fins, and processing time can also be decreased or avoided. Moreover, the above small thickness can reduce the resistance which a medium such as powder, liquid or the like undergoes when passing through the fine throughholes of the plate. When the thickness of the thin ceramic plate is larger than 100 μm, the formability of fine throughholes is reduced.

In order for the thin ceramic plate to have a thickness of 100 μm or less, the plate is preferably made mainly of partially stabilized zirconia, in view of the strength, toughness and abrasion resistance required for the plate.

The ceramic substrate is used in order to allow the ceramic member of the present invention to have a stiffness as a whole. The ceramic substrate has a (total) thickness of 80 μm or more, preferably 100 μm or more. When the thickness of the ceramic substrate is smaller than 80 μm, the resulting ceramic member has insufficient stiffness.

The ceramic substrate may have other function(s). The ceramic substrate may consist of a single layer or a plurality of layers. In the latter case, all the layers need not have the same shape and each layer may have a different function. Incidentally, the ceramic substrate 10 shown in FIG. 2B and 2C has no window.

In the ceramic member produced by the present invention, the thickness of the thin ceramic plate and the thickness of the ceramic substrate preferably satisfy the following relation:

Thickness of thin ceramic plate<thickness of ceramic substrate

When the thickness of the thin ceramic plate is larger than that of the ceramic substrate, the ceramic member obtained by sintering has reduced dimensional stability.

FIGS. 1A, 1B, 1C, 2A, 2B, 2C, 3A, 3B, and 3C show examples of the ceramic member having fine throughholes, produced by the present process.

Figure 1A:
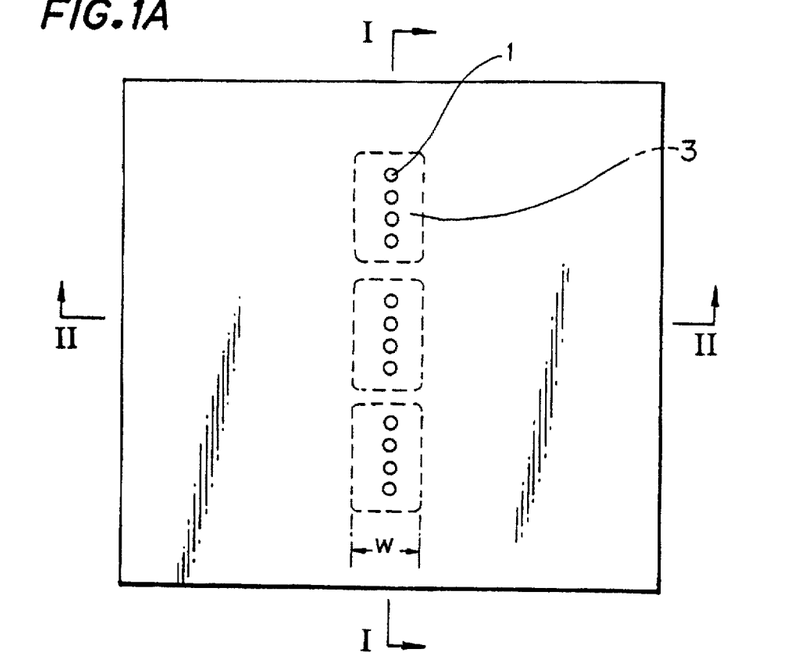
FIG. 1A is a plan view showing an example of the ceramic member having fine throughholes, produced by the present process.
Figure 1B:
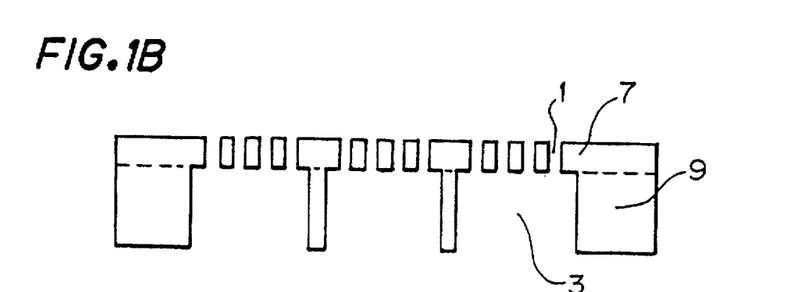
FIG. 1B is a sectional view taken at the I—I line of FIG. 1A.
Figure 1C:
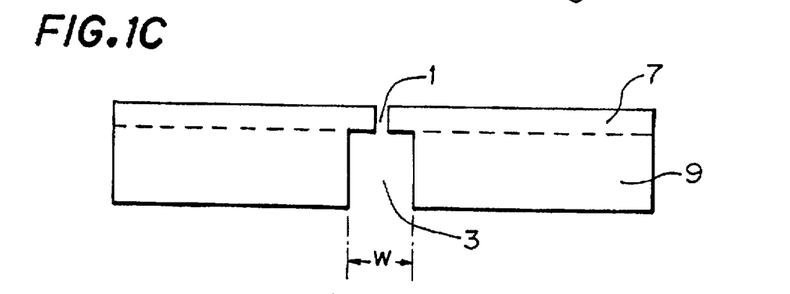
FIG. 1C is a sectional view taken at the II—II line of FIG. 1A.
Figure 2A:
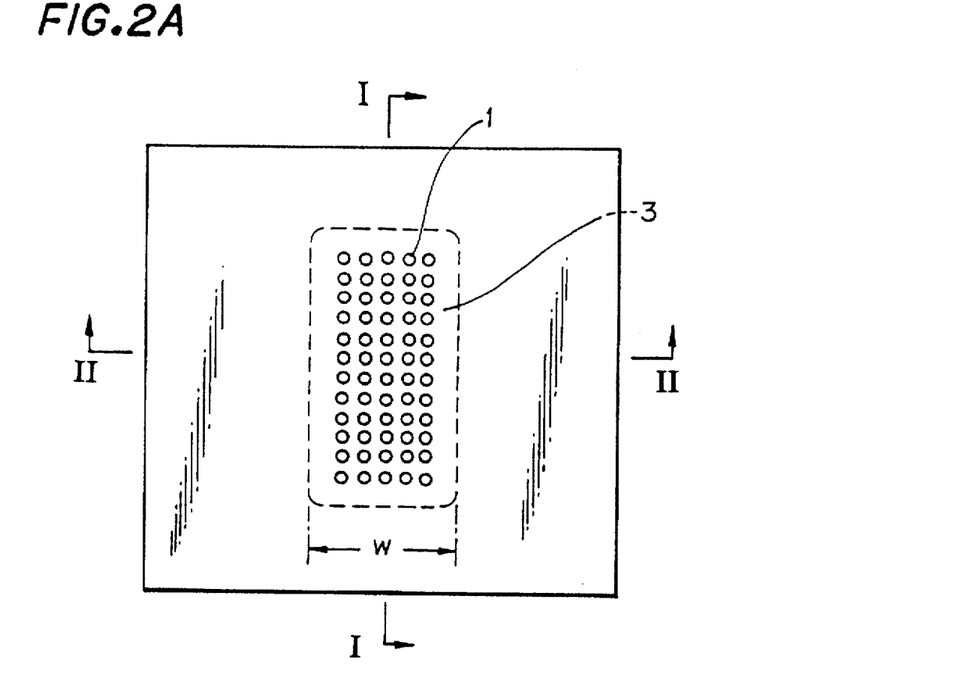
FIG. 2A is a plan view showing another example of the ceramic member having fine throughholes, produced by the present process.
Figure 2B:
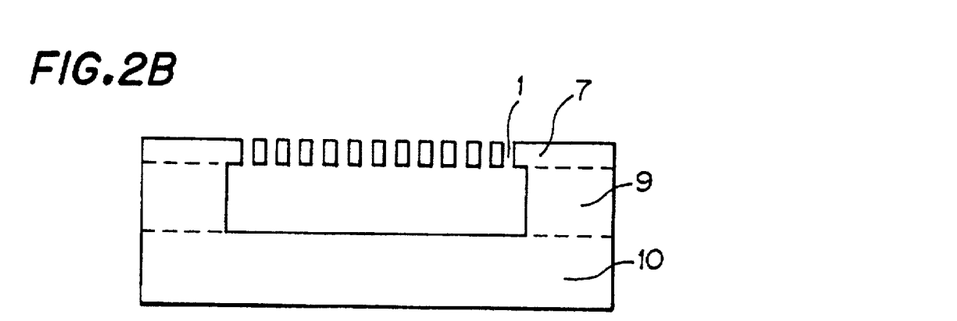
FIG. 2B is a sectional view taken at the I—I line of FIG. 2A.
Figure 2C:
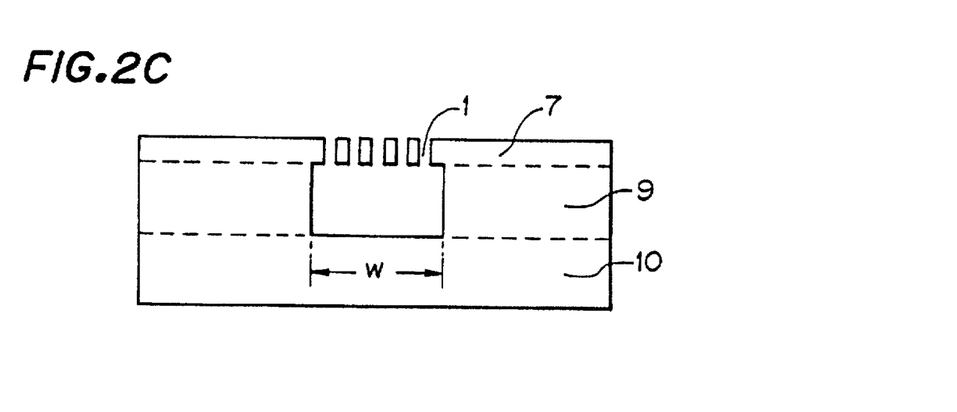
FIG. 2C is a sectional view taken at the II—II line of FIG. 2A.
Figure 3A:
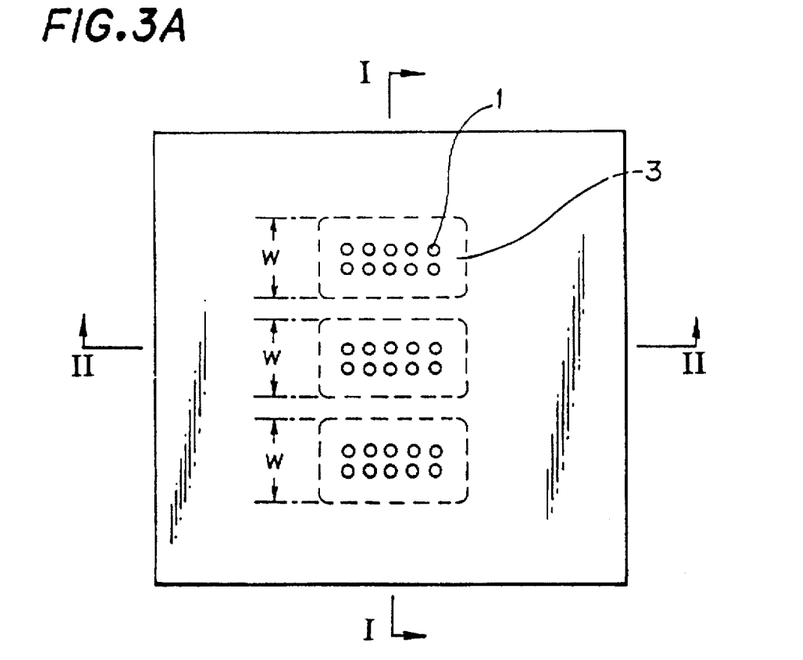
FIG. 3A is a plan view showing still another example of the ceramic member having fine throughholes, produced by the present process.
Figure 3B:
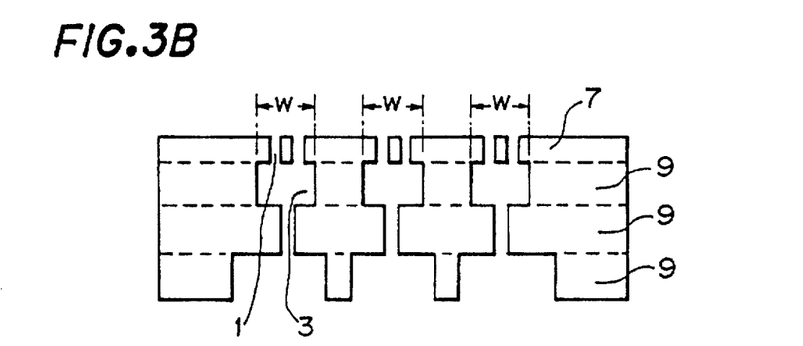
FIG. 3B is a sectional view taken at the I—I line of FIG. 3A.
Figure 3C:
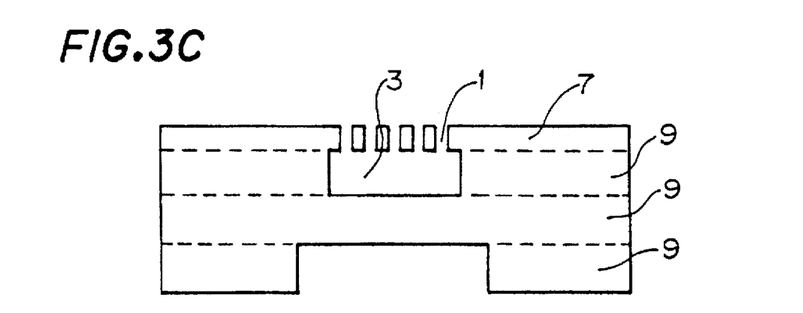
FIG. 3C is a sectional view taken at the II—II line of FIG. 3A.

FIGS. 1A, 1B, and 1C show a ceramic member wherein a thin ceramic plate 7 having fine throughholes 1 is laminated on a ceramic substrate 9 having windows 3 to form a unitarily sintered material. FIGS. 2A, 2B, and 2C show a ceramic member wherein a thin ceramic plate 7 having fine throughholes 1, a ceramic substrate 9 having a window 3 and a ceramic substrate 10 having no window are laminated in this order to form a unitarily sintered material. FIGS. 3A, 3B, and 3C show a ceramic member wherein a thin ceramic plate 7 having fine throughholes 1 is laminated on three layers of ceramic substrates 9 each having windows 3 (the window shapes of one substrate are different from those of other substrates), to form a unitarily sintered material.

In the present invention, the first green sheet for the thin ceramic plate and the second green sheet for the ceramic substrate are produced as follows. A slurry or paste for each green sheet is prepared in a conventional manner by mixing, into a ceramic powder, an appropriate binder, an appropriate plasticizer, an appropriate dispersing agent, an appropriate sintering aid, an appropriate organic solvent, etc. From the slurry or paste is formed s ceramic green sheet of desired thickness, by a known method such as doctor blade, calendering, printing process, reverse roll coater or the like. Then, cutting, punching, formation of fine throughholes, etc. are conducted as necessary; a plurality of green sheets are laminated by thermal pressing or the like; thereby, a unitary laminate having a desired shape and a desired thickness is formed. The formation of fine throughholes is conducted, for example, by the use of a die or an NC punching machine or by excimer laser processing. Incidentally, said formation may be conducted for a green sheet before lamination or for a laminate.

When there is used, as the thin ceramic plate, one composed mainly of partially stabilized zirconia, it is possible to add, to a partially stabilized zirconia powder, 30% by weight or less of an auxiliary such as alumina, silica, transition metal oxide, clay, mullite, cordierite, spinel, titania or mixture thereof.

The unitary laminate is then sintered and converted to a unitarily sintered material. The sintering temperature is generally about 1,200°–1,700° C., preferably about 1,300°–1,600° C.

Incidentally, when the unitarily sintered material has warpage, the warpage can be corrected by placing a flat ceramic-made weight or the like on the sintered material and subjecting them to resintering at a temperature close to the above-mentioned sintering temperature.

Desirably, the particle diameters of powder in the green sheet for the thin ceramic plate satisfy the following two conditions in order for the diameters of the fine throughholes and the distance between two adjacent fine throughholes to fall in respective target levels. In formation of fine throughholes in the green sheet by mechanical punching or by excimer laser processing, unlike in the case of processing of a sintered substrate, particles per se cannot be cut. Therefore, when the particle diameters of powder are large, the "after processing" surface of the green sheet and inner surfaces of the fine throughholes for the thin ceramic plate is inferior in precision, flatness, and smoothness, and also has fins.

Also, small particle diameters of powder are effective for making small the elongation of the green sheet for the thin ceramic plate taking place during formation of the fine throughholes.

Condition 1 for the Particle Diameters of Powder

A green sheet for thin ceramic plate is heat-treated at 500° C. for 2 hours to remove the organic components contained therein, such as binder, plasticizer, dispersing agent and the like, whereby a test sample is prepared. This test sample is measured for specific surface area by BET. Using this specific surface area, a sphere-equivalent diameter $D_{BET}$ of powder particles in the green sheet is calculated. By allowing the $D_{BET}$ to be in the following range, the resulting green sheet can have improved processability and handleability in the formation of fine throughholes:

$$0.02 \leq D_{BET} \leq 0.2 [\mu m]$$

wherein $$D_{BET} = 6/\rho S \ [\mu m]$$

ρ: theoretical density of powder [g/cm³]

S: specific surface area by BET, of powder [m²/g]

When $D_{BET}$ is smaller than 0.02, it is difficult to produce a green sheet of uniform quality. Further, an adhesion among powders increases, thereby deteriorating the precision, flatness, and smoothness.

Condition 2 for Particle Diameters of Powder

A slurry for the green sheet for the thin ceramic plate is diluted with the same solvent as used in the slurry or paste and then measured for average particle diameter by the use of LA-700 (a laser diffraction type particle size tester manufactured by Horiba). This average particle diameter is required to be 0.8 μm or less, preferably 0.6 μm or less. The smaller the average particle diameter, the higher is the flatness and smoothness of the surface or the inner surface of the fine throughholes of the green sheet after punching or laser excimer processing.

By allowing the volume percentage of ceramic powder and the volume percentage of organic components, both contained in the green sheet for the thin ceramic plate to satisfy the following formulas, there can be expected a increase in precision of formed fine throughholes, improvement in flatness and smoothness of the the surface of processed green sheet or the inner surface of the fine throughholes formed therein, reduction in generation of attachments in the green sheet, and reduction in elongation of the green sheet. Incidentally, the organic components refer to binder, plasticizer, dispersing agent, etc.

$$0.80 \leq A+B \leq 0.98$$

$$0.40 \leq A \leq 0.55$$

$$A = GDx[a/(a+b)] \times 1/\rho_{ce}$$

$$B = GDx\Sigma\{[b_i/(a+b)] \times 1/\rho_i\}$$

wherein

A: volume percentage of ceramic powder,

B: volume percentage of organic components, a: parts by weight of ceramic powder, b: parts by weight of organic components (b=Σb$_i$), b$_i$: parts by weight of single organic component, GD: density of "as molded" green sheet [g/cm³], $\rho_{ce}$: theoretical density of ceramic powder [g/cm³], $\rho_i$: theoretical density of single organic component [g/cm³].

The crystal phase of partially stabilized zirconia in the thin ceramic plate having fine throughholes is allowed to consist mainly of a tetragonal system or at least two systems selected from cubic system, tetragonal system and monoclinic system. The thin ceramic plate having fine throughholes is preferably composed mainly of partially stabilized zirconia having such a crystal phase, because such a composition can endow the thin ceramic plate with excellent strength and toughness.

It is advantageous to use an adhesive layer between the green sheet for the thin ceramic plate and the green sheet for the ceramic substrate. Use of this adhesive layer can reduce the pressure required for laminating the two green sheets. The lamination pressure is preferably 100 kg/cm² or less, more preferably 40 kg/cm² or less. Too large a lamination pressure tends to generate cracks between the fine throughholes because the distance between the fine throughholes is small.

The material for the adhesive layer may be the slurry, paste, binder, plasticizer, solvent or mixture thereof, all used in production of the green sheet.

The adhesive layer is formed preferably by coating, printing, spraying or the like.

Preferably, the sintering shrinkage curve of the green sheet for the thin ceramic plate and the sintering shrinkage curve of the green sheet for the ceramic substrate satisfy the following condition:

$$-50° C. \leq T(\text{thin plate}) - T(\text{substrate}) \leq +50° C.$$

more preferably $$-20° C. \leq T(\text{thin plate}) - T(\text{substrate}) \leq +20° C.$$

Desirably, the two curves are identical particularly at the initial period of sintering shrinkage. In the above formula, T (thin plate) refers to a temperature (°C.) at which the green sheet for the thin ceramic plate, when subjected per se to sintering under the same temperature conditions as applied for the laminate of the above two green sheets, shows 50% of the shrinkage S (thin plate) in the surface direction; and T (substrate) refers to a temperature (°C.) at which the green sheet for the ceramic substrate, when subjected per se to sintering under the same temperature conditions as applied for the laminate of the above two green sheets, shows 50% of the shrinkage S (substrate) in the surface direction.

When the above condition is not met, the thin ceramic plate, which has a small thickness, tends to form wrinkles and dents owing to the stress generated during sintering; further, the thin ceramic plate, in which the hole-to-hole distance is small, tends to generate cracks between the holes.

Next, the present invention is specifically described by way of Example.

First, a thin green sheet was prepared as follows.

In a ball mill were mixed, for 30 hours, 100 parts by weight of a partially stabilized zirconia powder containing 3 mole % of $Y_2O_3$ ($D_{BET}$ of powder=0.1 μm), 8 parts by weight of a polyvinyl butyral resin (binder), 3 parts by weight of DOP (plasticizer), 2 parts by weight of a sorbitan fatty acid ester type dispersing agent, 35 parts by weight of xylene (solvent) and 35 parts by weight of 1-butanol (solvent), whereby a slurry for green sheet formation having a viscosity of 2,000 cp was obtained. The slurry was subjected to defoaming under vacuum to adjust the viscosity to 4,000 cp. Using the resulting slurry, a thin preen sheet was formed so as to have a thickness (after sintering) of 30 μm, by the use of a doctor blade apparatus.

The slurry after defoaming under vacuum was diluted with a xylene/1-butanol solvent (1:1 by weight ratio) and measured for average particle diameter. The average particle diameter was 0.58 μm. Incidentally, the tester used for the measurement was LA-700 (a laser diffraction type particle size tester manufactured by Horiba).

In the above-obtained thin green sheet, the volume percentage of ceramic powder was 49%, and the total of the volume percentage of organic components other than solvent and the volume percentage of ceramic powder was 88%.

Figure 5A:
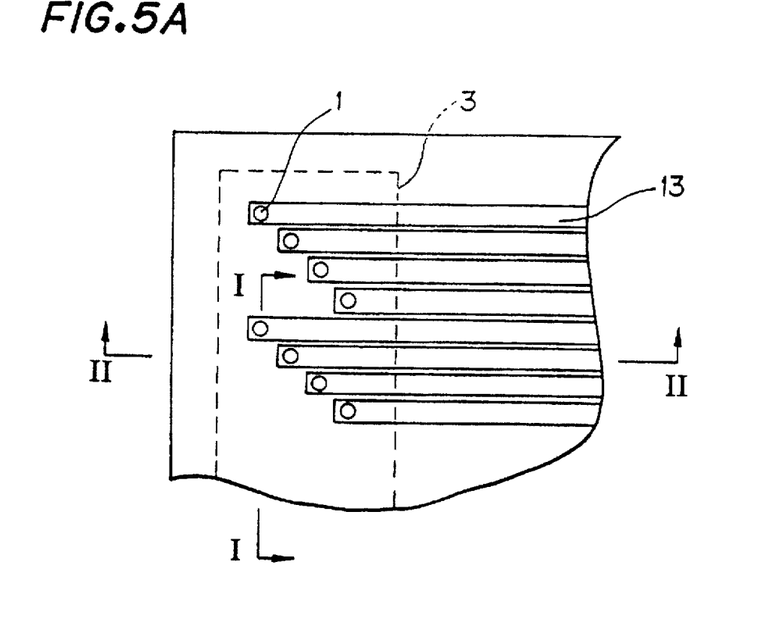
FIG. 5A is a partially cut-away plan view showing an example of the constitution of an electrode for a field shutter.
Figure 5B:
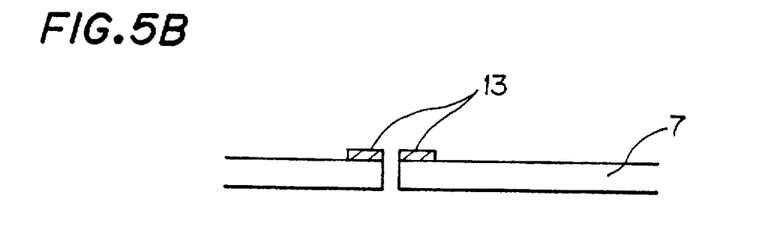
FIG. 5B is a sectional view taken at the I—I line of FIG. 5A.
Figure 5C:
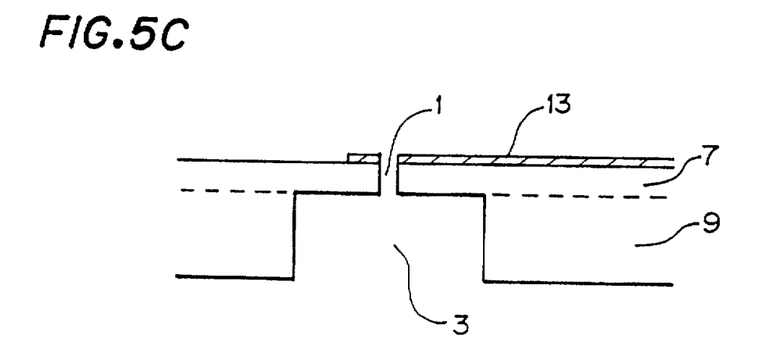
FIG. 5C is a sectional view taken at the II—II line of FIG. 5A.

The thin green sheet was subjected to punching by an NC punching machine to form 2,832 fine throughholes 1 so as to have a hole diameter of 40 μm and a hole-to-hole distance of 36.7 μm in four rows each of 708 holes, as shown in FIGS. 5A, 5B, and 5C. Then, the sheet was cut so as to have an external form of 230 mm×20 mm.

Next, using the above-obtained slurry for green sheet formation, a green sheet for ceramic substrate was prepared so as to have a thickness (after sintering) of 150 μm, by the use of a doctor blade apparatus.

On this green sheet for the ceramic substrate was formed an adhesive layer as follows. In a triroll mill were kneaded 100 parts by weight of a partially stabilized zirconia powder containing 3 mole % of $Y_2O_3$ ($D_{BET}$ of powder=0.1 μm), 13 parts by weight of a polyvinyl butyral resin (binder), 5 parts by weight of DOP (plasticizer) and 50 parts by weight of 2-ethylhexanol, whereby an adhesive paste having a viscosity of 20,000 cp was obtained. This paste was printed on the green sheet for the ceramic substrate by the use of a screen printing machine to form an adhesive layer having a thickness (after drying) of 6 μm.

The green sheet having an adhesive layer thereon was subjected to cutting and punching to obtain a shape (window size: 201 mm×0.95 mm) as shown in FIGS. 5A, 5B, and 5C.

The thin green sheet and the green sheet having an adhesive layer thereon were laminated and thermal-pressed under the conditions of 30 kg/cm², 80° C. and 1 minute to produce a unitary laminate.

The unitary laminate was sintered at 1,500° C. for 3 hours. The resulting unitarily sintered material was sandwiched between flat porous aluminum plates of 2 mm in thickness and resintered at 1,500° C. for 5 hours to correct warpage. In the sintered material, the average grain diameter of ceramic grains in the thin ceramic portion was 0.7 μm.

Thus, there can be produced a ceramic member which is a unitarily sintered material comprising a thin ceramic plate 7 having fine throughholes 1 and a ceramic substrate 9 having a window 3. By forming gold electrodes 13 on this ceramic member, there can be obtained a field shutter as shown in FIGS. 5A, 5B, and 5C.

Figure 4:
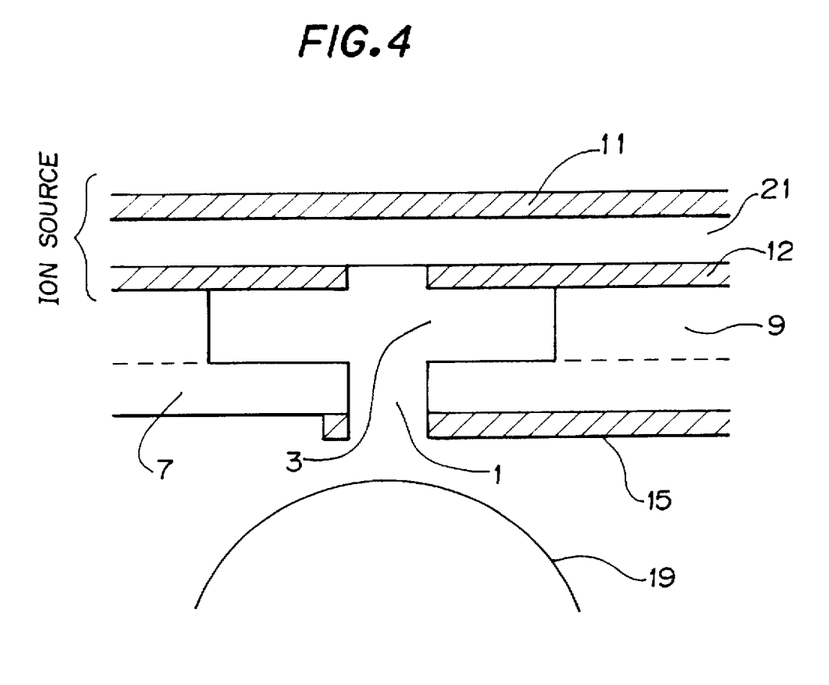
FIG. 4 is a sectional view showing an example of the constitution of an ion current-controlling head.

The above-produced ceramic member having fine throughholes can also be used as an ion current-controlling head, as shown in FIG. 4.

That is, by combining (1) the above-produced ceramic member having formed thereon electrodes 15 for the electric field shutter (gold electrodes having a thickness of 0.3 μm), (2) an ion source comprising a thin dielectric plate 21 and a line electrode 11 and a finger electrode 12 provided on both sides of the plate, and (3) a dielectric drum 19, an ion current-controlling head as shown in FIG. 4 can be assembled.

The application of the ceramic member produced by the present process is not restricted to the ion current-controlling head. The ceramic member can be used also in other applications requiring a member having fine throughholes in the thin plate portion.

As is clear from the above description, the ceramic member having fine throughholes, produced by the present process, since the thin ceramic plate portion is made of a ceramic material of heat resistance, abrasion resistance, corrosion resistance and low thermal expansion, can be applied to various media over a wide temperature range and is superior in positional and dimensional precisions as well as in durability. Therefore, the ceramic member is applicable to a wide range of apparatuses and is very useful.

What is claimed is:

1. A process for producing a ceramic member having fine throughholes, which comprises:
   preparing a first green sheet for a thin ceramic plate,
   forming, in the first green sheet, a plurality of fine throughholes so that the hole-to-hole distance after sintering becomes 70 μm or less,
   preparing a second green sheet for a ceramic substrate,
   forming at least one window in the second green sheet,
   laminating the first green sheet having a plurality of fine throughholes, on the second green sheet having at least one window so that the plurality of fine throughholes correspond to the at least one window, to form a unitary laminate, and
   sintering the laminate to produce a unitarily sintered material as a ceramic member having fine throughholes.

2. A process according to claim 1, wherein the thin ceramic plate of the ceramic member consists essentially of partially stabilized zirconia.

3. A process according to claim 2, wherein the thin ceramic plate of the ceramic member comprises crystal grains having diameters of 2 μm or less.

4. A process according to claim 2, wherein the partially stabilized zirconia in the thin ceramic plate of the ceramic member is zirconia stabilized partially with 2–6 mole % of yttrium oxide.

5. A process according to claim 1, wherein the fine throughholes of the thin ceramic plate of the ceramic member have diameters of 150 μm or less.

6. A process according to claim 1, wherein the thin ceramic plate of the ceramic member has a thickness of 100 μm or less.

7. A process according to claim 1, wherein the ceramic substrate of the ceramic member has a thickness of 80 μm or more.

8. A process for producing a ceramic member having fine throughholes, which comprises:
   preparing a first green sheet for a thin ceramic plate,
   preparing a second green sheet for a ceramic substrate,
   forming at least one window in the second green sheet,
   laminating the first green sheet on the second green sheet having at least one window so that the first green sheet covers the at least one window, to form a unitary laminate,
   forming, in the laminate, a plurality of fine throughholes portions of the first green sheet corresponding to the at least one window of the second green sheet so that the hole-to-hole distance after sintering becomes 70 μm or less, and
   sintering the laminate to produce a unitarily sintered material as a ceramic member having fine throughholes.

9. A process according to claim 8, wherein the thin ceramic plate of the ceramic member consists essentially of partially stabilized zirconia.

10. A process according to claim 9, wherein the thin ceramic plate of the ceramic member comprises crystal grains having diameters of 2 μm or less.

11. A process according to claim 9, wherein the partially stabilized zirconia in the thin ceramic plate of the ceramic member is zirconia stabilized partially with 2–6 mole % of yttrium oxide.

12. A process according to claim 8, wherein the fine throughholes of the thin ceramic plate of the ceramic member have diameters of 150 μm or less.

13. A process according to claim 8, wherein the thin ceramic plate of the ceramic member has a thickness of 100 μm or less.

14. A process according to claim 8, wherein the ceramic substrate of the ceramic member has a thickness of 80 μm or more.

15. A process for producing a ceramic member having fine throughholes, which comprises:
   preparing a first green sheet for a thin ceramic plate,
   forming a plurality of fine throughholes corresponding to the window in the first green sheet, preparing a second green sheet for a ceramic substrate, forming at least one window in the second green sheet, laminating the first green sheet having a plurality of fine throughholes, on the second green sheet having at least one window so that the plurality of fine throughholes correspond to the at least one window, to form a unitary laminate, and sintering the laminate to produce a unitarily sintered material as a ceramic member having fine throughholes, wherein the window and the fine throughholes are formed so that they satisfy the following relation:

$$W(mm) \geq 0.01/d(mm)$$

wherein w is the width of the window after sintering and d is the hole-to-hole distance after sintering.

16. A process according to claim 15, wherein the thin ceramic plate of the ceramic member consists essentially of partially stabilized zirconia.

17. A process according to claim 16, wherein the thin ceramic plate of the ceramic member comprises crystal grains having diameters of 2 μm or less.

18. A process according to claim 16, wherein the partially stabilized zirconia in the thin ceramic plate of the ceramic member is zirconia stabilized partially with 2–6 mole % of yttrium oxide.

19. A process according to claim 15, wherein the fine throughholes of the thin ceramic plate of the ceramic member have diameters of 150 μm or less.

20. A process according to claim 15, wherein the thin ceramic plate of the ceramic member has a thickness of 100 μm or less.

21. A process according to claim 15, wherein the ceramic substrate of the ceramic member has a thickness of 80 μm or more.

22. A process for producing a ceramic member having fine throughholes, which comprises:

preparing a first green sheet for a thin ceramic plate, preparing a second green sheet for a ceramic substrate, forming at least one window in the second green sheet, laminating the first green sheet on the second green sheet having at least one window so that the first green sheet covers the at least one window, to form a unitary laminate, forming, in the laminate, a plurality of fine throughholes at portions of the first green sheet corresponding to the at least one window of the second green sheet, and sintering the laminate to produce a unitarily sintered material as a ceramic member having fine throughholes, wherein the window and the fine throughholes corresponding to the window are formed so that they satisfy the following relation:

$$W(mm) \geq 0.01/d(mm)$$

wherein w is the width of the window after sintering and d is the hole-to-hole distance after sintering.

23. A process according to claim 22, wherein the thin ceramic plate of the ceramic member consists essentially of partially stabilized zirconia.

24. A process according to claim 23, wherein the thin ceramic plate of the ceramic member comprises crystal grains having diameters of 2 μm or less.

25. A process according to claim 23, wherein the partially stabilized zirconia in the thin ceramic plate of the ceramic member is zirconia stabilized partially with 2–6 mole % of yttrium oxide.

26. A process according to claim 22, wherein the fine throughholes of the thin ceramic plate of the ceramic member have diameters of 150 μm or less.

27. A process according to claim 22, wherein the thin ceramic plate of the ceramic member has a thickness of 100 μm or less.

28. A process according to claim 22, wherein the ceramic substrate of the ceramic member has a thickness of 80 μm or more.

* * * * *